United States Patent
Hamming (10) Patent No.: US 6,626,387 B1
(45) Date of Patent: Sep. 30, 2003

(54) ROLLING ELEMENT FOR GUIDING A HUB FILLER IN A TAPE DRIVE

(75) Inventor: John Anthony Hamming, Laguna Niguel, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 0 days.

(21) Appl. No.: 09/907,623

(22) Filed: Jul. 19, 2001

Related U.S. Application Data (60) Provisional application No. 60/221,223, filed on Jul. 25, 2000.

(51) Int. Cl.[7] ............................................. G11B 5/008
(52) U.S. Cl. .................. 242/332.4; 242/332.5; 242/332.8; 384/58
(58) Field of Search ................... 242/332.8, 332.4, 242/332.5; 384/58

(56) References Cited

U.S. PATENT DOCUMENTS

| | | | | |
|---|---|---|---|---|
| 4,335,858 A | * | 6/1982 | Cranna ..................... | 242/332.4 |
| 4,399,936 A | * | 8/1983 | Rueger ................. | 242/332.4 X |
| 4,608,614 A | * | 8/1986 | Rinkleib et al. ..... | 242/332.4 X |
| 4,681,278 A | * | 7/1987 | Smith ...................... | 242/332.4 |
| 5,156,443 A | * | 10/1992 | Ide ........................... | 384/58 X |
| 5,219,129 A | * | 6/1993 | Spicer et al. ......... | 242/332.4 X |
| 5,243,477 A | * | 9/1993 | Grant et al. .......... | 242/332.4 X |
| 6,034,839 A | * | 3/2000 | Hamming ............ | 242/332.4 X |
| 6,082,652 A | * | 7/2000 | Theobald ................. | 242/332.4 |
| 6,378,796 B1 | * | 4/2002 | Hamming et al. ....... | 242/332.4 |
| 6,437,938 B1 | * | 8/2002 | Wada ................. | 242/332.4 X |

FOREIGN PATENT DOCUMENTS

| | | | | |
|---|---|---|---|---|
| JP | 0 568 852 A1 | * | 11/1993 | ............... 384/58 X |
| JP | 6-168524 A | * | 6/1994 | ............... 242/332.8 |
| JP | 6-168525 | | 6/1994 | |

* cited by examiner

*Primary Examiner*—Kathy Matecki
*Assistant Examiner*—Sang Kim
(74) *Attorney, Agent, or Firm*—McDermott, Will & Emery (57) ABSTRACT

An arrangement for loading a tape from a removable tape cartridge into a take-up reel has a hub filler that is frictionlessly guided from a removable tape cartridge to a take-up reel utilizing a roller element attached to the bottom of the hub filler. The roller element prevents the wearing down of the guide pin and allows for accurate and reliable picking up and dropping off of tape at the tape cartridge.

9 Claims, 13 Drawing Sheets

ROLLING ELEMENT FOR GUIDING A HUB FILLER IN A TAPE DRIVE

This application claims priority from U.S. Provisional Application Ser. No. 60/221,223, filed Jul. 25, 2000, incororated herein by reference.

FIELD OF THE INVENTION

The present invention relates to a method and apparatus for loading and unloading tape from a removable tape cartridge in a tape drive.

DESCRIPTION OF RELATED ART

Single reel tape cartridges are used to transport and store tape for reel-to-reel tape drives. A single reel tape cartridge is inserted into a tape drive and a mechanism is used to load the end of the tape into a take-up reel from the tape cartridge. Once the end of the tape is loaded into the take-up reel, the tape drive operates as a reel-to-reel tape drive. A motor is coupled to the take-up reel to rotate the take-up reel about the take-up reel axis and another motor is coupled to the single reel tape cartridge to rotate the reel of the tape cartridge about its axis.

The tape drive loading mechanism attaches to a tape leader pin, located at the end of the tape contained in the single reel tape cartridge. The hub filler uses a slot in the hub filler for receiving the tape leader pin. The hub filler is coupled to a guide arm that drives the hub filler along a guide rail between the single reel tape cartridge and the take-up reel. An example of a mechanism for driving the hub filler between the tape cartridge and the take-up reel is disclosed in U.S. Pat. No. 6,034,839.

Figure 1:
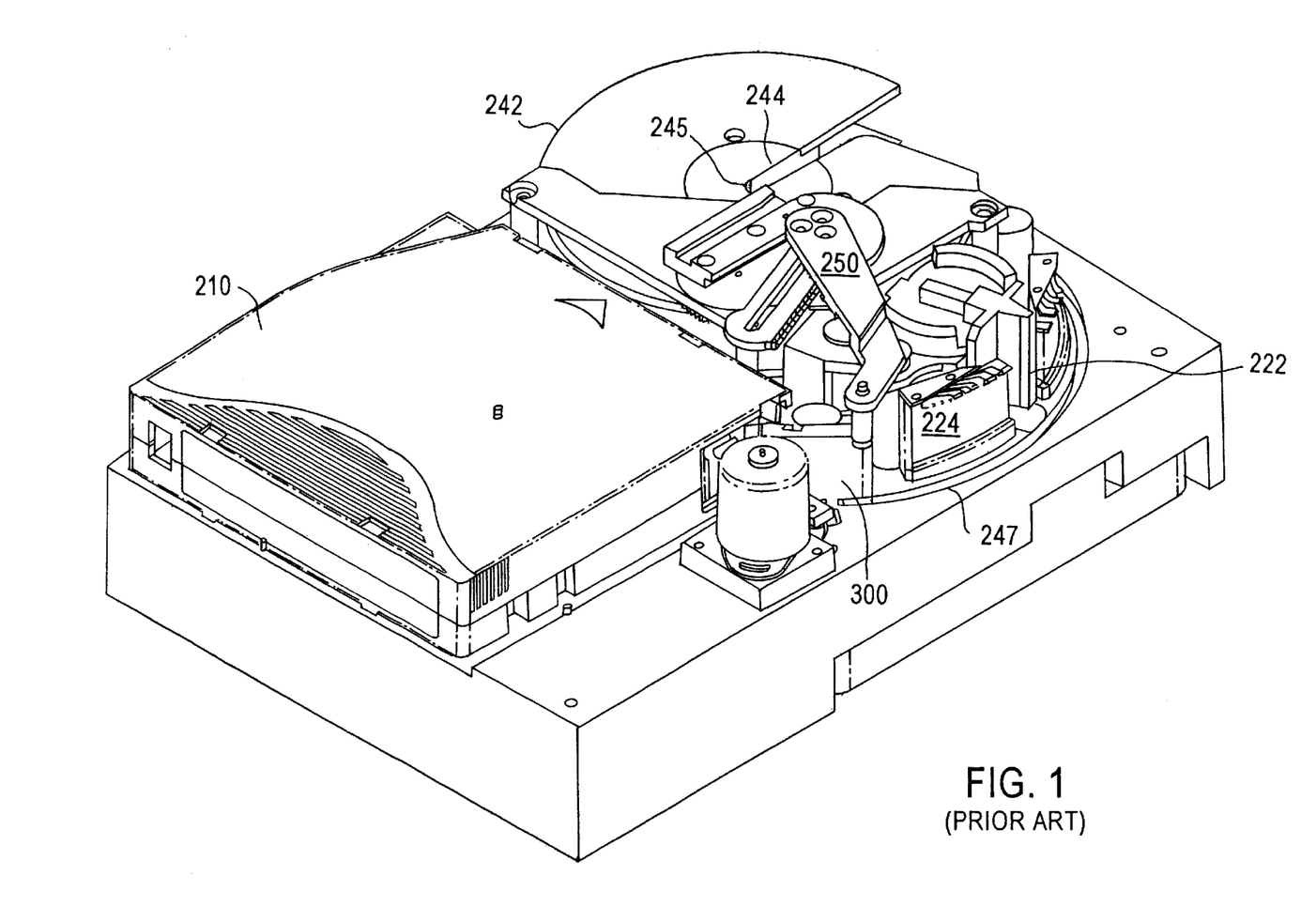
FIG. 1 is a view of a prior art tape drive loading mechanism.

FIG. 1 is a view of the tape drive loading mechanism disclosed in U.S. Pat. No. 6,034,839. The hub filler 300 enters into the removable cartridge 210 and attaches to the end of the tape. The hub filler 300 then moves along a guide rail 247, driven by the guide arm 250. Typically, the hub filler 300 attaches to the end of a tape in the tape cartridge 210 and the guide arm 250 moves the hub filler 300 along the guide rail 247, trailing the tape across the read/write head 222 and into the take-up reel 242. The hub filler 300 comprises a pin (not shown) fixedly attached to the bottom of the hub filler 300 that is in contact with the guide rail 247. More particularly, the hub filler 300 rides on the top of the guide rail 247 and is guided in the horizontal direction from the removable cartridge 210 to the hub 245 of the take-up reel 242. When the hub filler 300 enters the removable cartridge 210 to attach the end of the tape, the pin moves snuggly within the guide rail 247 at the cartridge to precisely control the position of the hub filler 300 during pick up of the tape. The tape is attached to the hub filler 300 and the hub filler 300 travels along the guide rail 247 between the removable cartridge 210 and the hub 245. During this movement, the pin is in contact with the inner surface of the guide rail 247. The hub filler 300 enters the take-up reel 245 through a channel 244 and into the hub 245 of the take-up reel 242.

Figure 2:
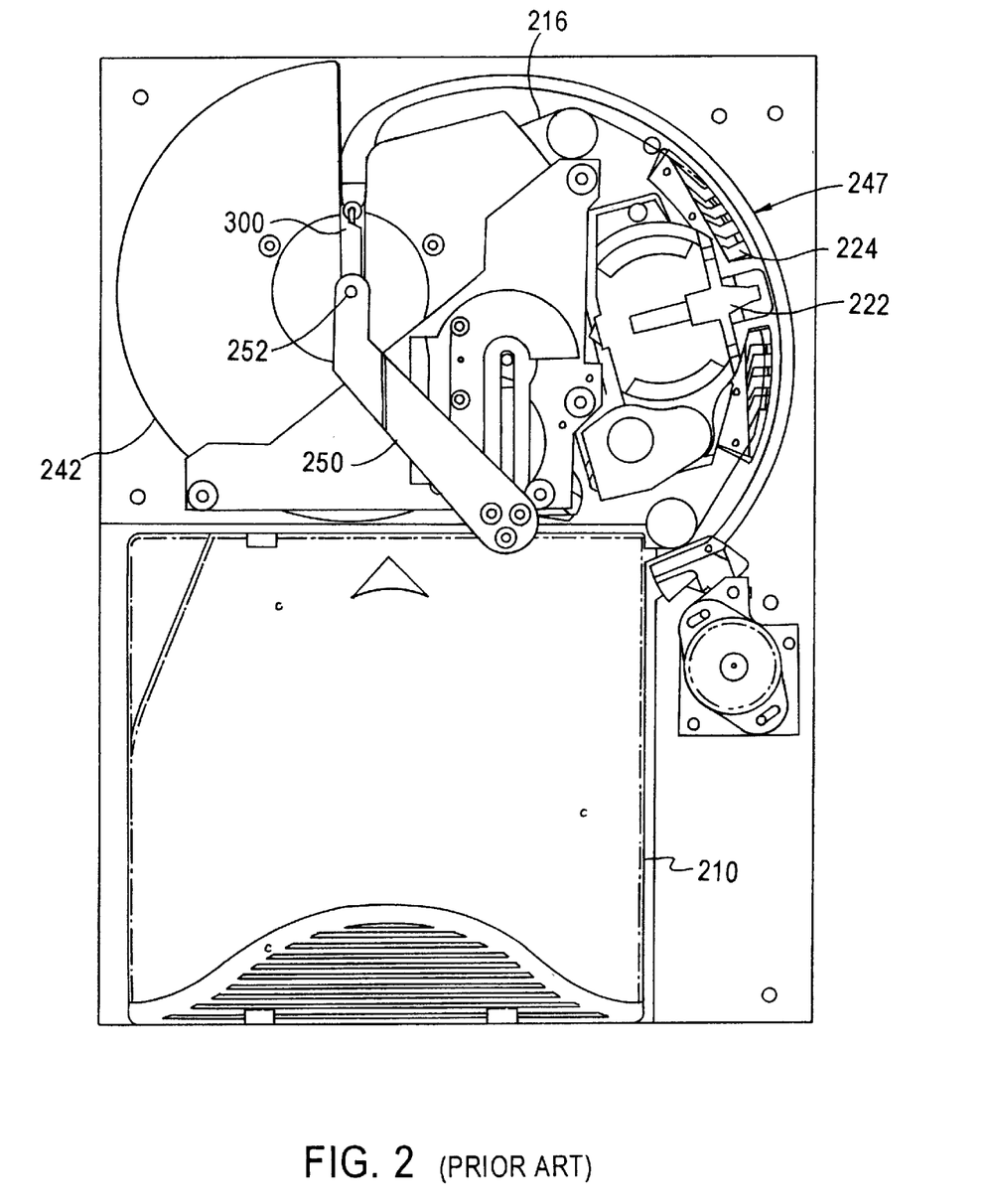
FIG. 2 is a top view of the prior art tape drive loading mechanism of FIG. 1.

FIG. 2 is a top view of the tape drive, depicting the hub filler 300 in the take-up reel 242 with the tape 216 attached. The tape 216 passes across the read/write head 222 and the end of the tape 216 is secured to the take-up reel 242. The tape drive is then operated by rotation of the take-up reel 242 and the single reel of the cartridge 210 about their respective axes to move the tape 216 across the read/write head 222. Motors are used to rotate the take-up reel 242 and the single reel of the cartridge 210, controlling the speed of the tape 216 as it moves across the read/write head 222. The hub filler 300 pivots on an axle 252 that is coupled to the guide arm 250. This pivoting is necessary for the hub filler 300 to be guided on the guide rail 247 into the take-up reel 242. Once the hub filler 300 is in the take-up reel 242, with the tape 216 attached, the take-up reel 242 rotates to thereby unload the tape from the cartridge 210. The hub filler 300 rotates with the take-up reel 242 on the axle 252. The loading mechanism attempts to align the axle 252 axis and the take-up reel 242 axis perfectly.

There are some concerns regarding the conventional tape drive loading mechanism described above. As the hub filler moves along the guide rail, only a small surface area of the pin is in contact with the inner surface of the guide rail. Consequently, there may be substantial friction between the guide rail and the pin. As a result, the pin becomes worn down as it travels repeatedly between the tape cartridge and the take-up reel.

The wearing down of the pin is a source of several problems in the conventional tape drive loading mechanism. One problem is that the wearing down of the pin reduces the accuracy with which the hub filler can pick up and drop off tape at the removable tape cartridge. The portion of the guide rail that is proximate to the removable cartridge needs to be arranged so the pin fits snugly in the guide rail. This is necessary so that the hub filler is tightly controlled and can accurately and repeatedly pick up the tape from the tape cartridge. However, if the pin is worn down, the pin will not fit snugly in this portion of the guide rail and the accuracy of the hub filler picking up the tape from the cartridge is diminished. This diminished accuracy increases the instances of the tape drive failing to load tape from removable cartridges, which compromises the reliability of the tape drive. Those skilled in the art will appreciate that the reliability of the tape pick-up and tape drop-off mechanism is an important characteristic of tape loading devices.

SUMMARY OF THE INVENTION

There is a need for a tape drive loading mechanism that guides a hub filler between a removable tape cartridge and a take-up reel substantially without friction.

These and other needs are met by embodiments of the present invention, which provide the implementation of a roller in place of the conventional pin at the bottom of the hub filler. More particularly, the present invention relates to a tape loading device for loading tape from a tape cartridge to a take-up reel. The device comprises a hub filler and a means for frictionless guiding of the hub filler between the tape cartridge and the tape-up reel. The hub filler is driven independent of the take-up reel.

With the present invention, the roller on the bottom of the hub filler substantially eliminates friction between the hub filler and the guide rail. As a result of this reduced friction, the roller experiences reduced wear. The roller is able to snugly fit within the portion of the guide rail proximate to the removable tape cartridge. The hub filler of the present invention can therefore more accurately pick up and drop off tape from the tape cartridge.

The foregoing and other features, aspects, and advantages of the present invention will become more apparent from the following detailed description of the present invention, taken in conjunction with the accompanying drawings.

DETAILED DESCRIPTION OF THE INVENTION

The present invention relates to an apparatus for loading a take-up reel with tape from a tape cartridge. The tape cartridge of the present invention is a single reel cartridge. Accordingly, it is necessary for the tape drive to load the end of the tape from the cartridge into the take-up reel. A hub filler, which is part of the tape drive, receives the end of the tape from the cartridge. After the hub filler has attached to the end of the tape in the cartridge, usually by attaching to a leader pin that is connected to the end of the tape, the hub filler moves along a guide rail pulling the tape out of the cartridge, across the read/write head, and to the take-up reel. The hub filler is driven independent of the take-up reel. The hub filler comprises a roller element which is in contact with the guide rail and provides for substantial frictionless guiding of the hub filler between the cartridge and the take-up reel. The hub filler enters the take-up reel, with the tape attached, and brings the hub filler to the hub of the take-up reel. Upon the hub filler attaching to the take-up reel, the tape is connected to both the single reel of the cartridge and the take-up reel. The rotation of the two reels controls the movement of the tape across the read/write head and consequently, the reading of the tape. A guide arm moves the hub filler from the cartridge to the take-up reel. The hub filler pivots on an axle as it is driven by the guide arm. As the hub filler enters the take-up reel, the axle decouples from the hub filler.

Figure 3:
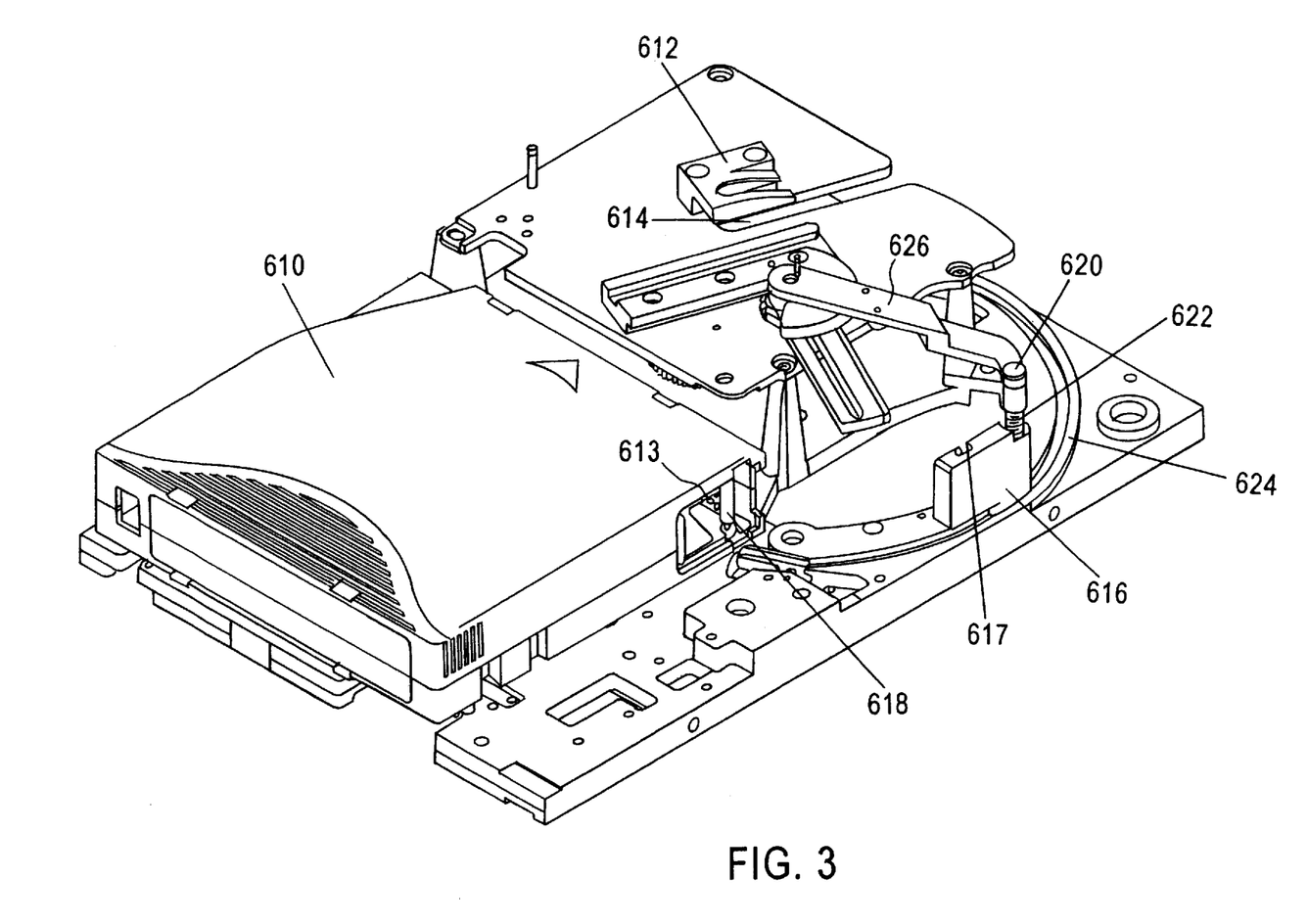
FIG. 3 is a view of the tape drive loading mechanism of the present invention.

FIG. 3 is a view of the tape drive loading mechanism of the present invention. A single reel tape cartridge 610 is shown in a loaded position in the tape drive. The tape 613 is wound on a reel inside the cartridge 610. The end of the tape 613 is attached to a leader pin 618. A hub filler 616 moves along a guide rail 624, driven by a guide arm 626, from the cartridge 610 to a take-up reel 614. The hub filler 616 pivots on an axle 620. The hub filler 616 is held to the guide rail 624 by pressure from a spring 622 as the hub filler 616 moves along the guide rail 624 between the tape cartridge 610 and the take-up reel 614. The hub filler 616 also includes a notch 617 that attaches to the leader pin 618 when entering the cartridge 610. As the hub filler 616 enters the take-up reel 614, the axle 620 is lifted from the hub filler 616 by a ramp 612.

Other mechanisms can be used to de-couple the axle 620 from the hub filler 616 within the scope of the invention. For example, one embodiment that may be used to de-couple the axle 620 from the hub filler 616 is a spring mechanism that manipulates spring tensions at the take-up reel 614 to lift the axle 620 out of the hub filler 616. Other embodiments include a snap coupling arrangement and a latch and release arrangement. Still another embodiment that may be used to de-couple the axle 620 is a motor lifting the axle 620 out of the hub filler 616. The above-described embodiments for lifting the axle 620 out of the hub filler 616 are not exclusive.

Figure 4:
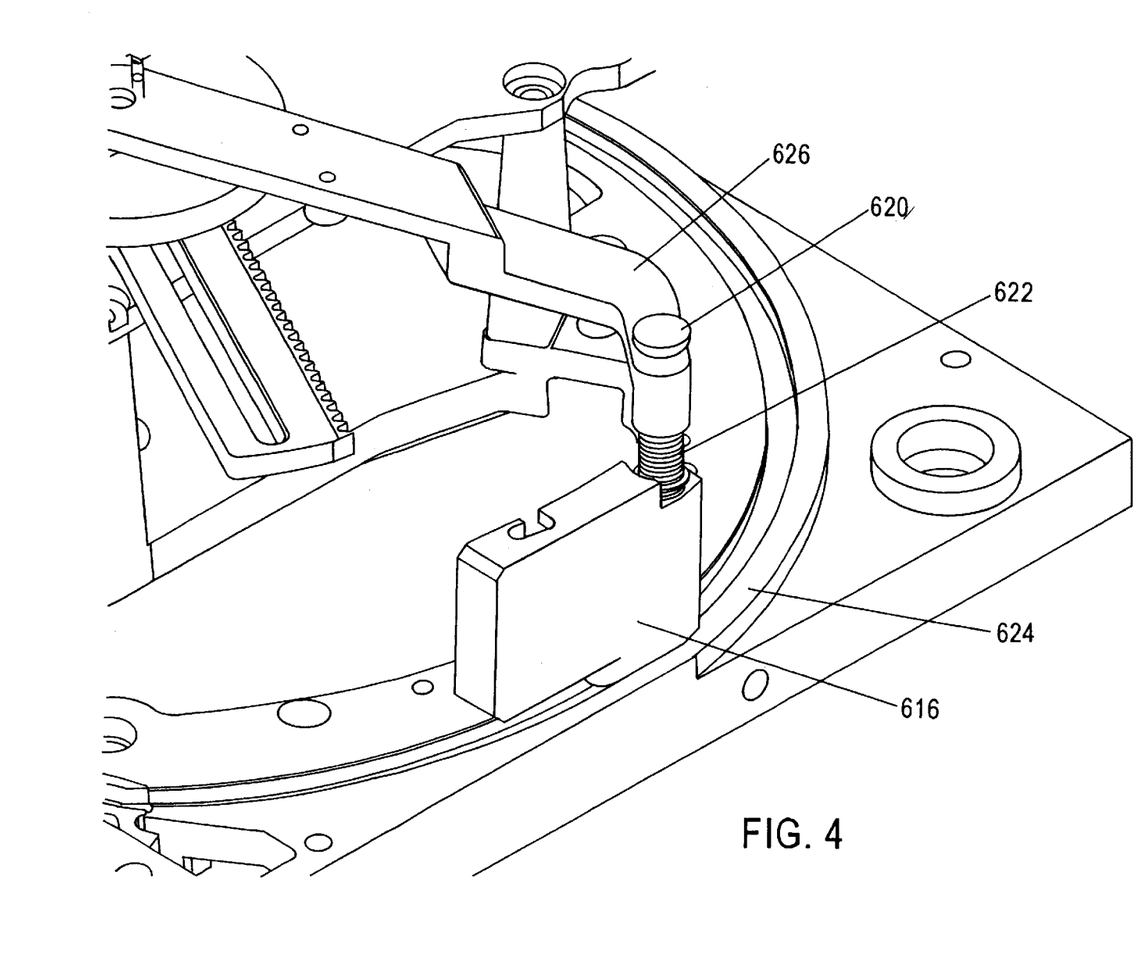
FIG. 4 is a view of the hub filler on the guide rail.

FIG. 4 is a view of the hub filler 616 on the guide rail 624 between the tape cartridge 610 and the take-up reel 614. The hub filler 616 is held to the guide rail 624 by the spring 622 disposed around the axle, creating tension between the hub filler 616 and the guide arm 626. The axle 620 can move in the vertical direction and rotates in a bore of the guide arm 626. The top of the axle 620 has a portion that is larger than the bore of the guide arm 626. The guide arm 626 moves in a horizontal plane during travel between the cartridge 610 and the take-up reel 614. The spring 622 between the guide arm 626 and the hub filler 616 exerts downward pressure (as viewed in FIG. 4) on the hub filler 616, pressing the hub filler 616 against the guide rail 624. This ensures that the hub filler 616 stays on the guide rail 624 during travel from the cartridge 610 to the take-up reel 614. The spring 622 is attached to a notch in the axle 620 and pushes the axle 620 into the hub filler 616. When the axle 620 is pulled out of the hub filler 616, the tension of the spring 622 is increased.

Figure 5:
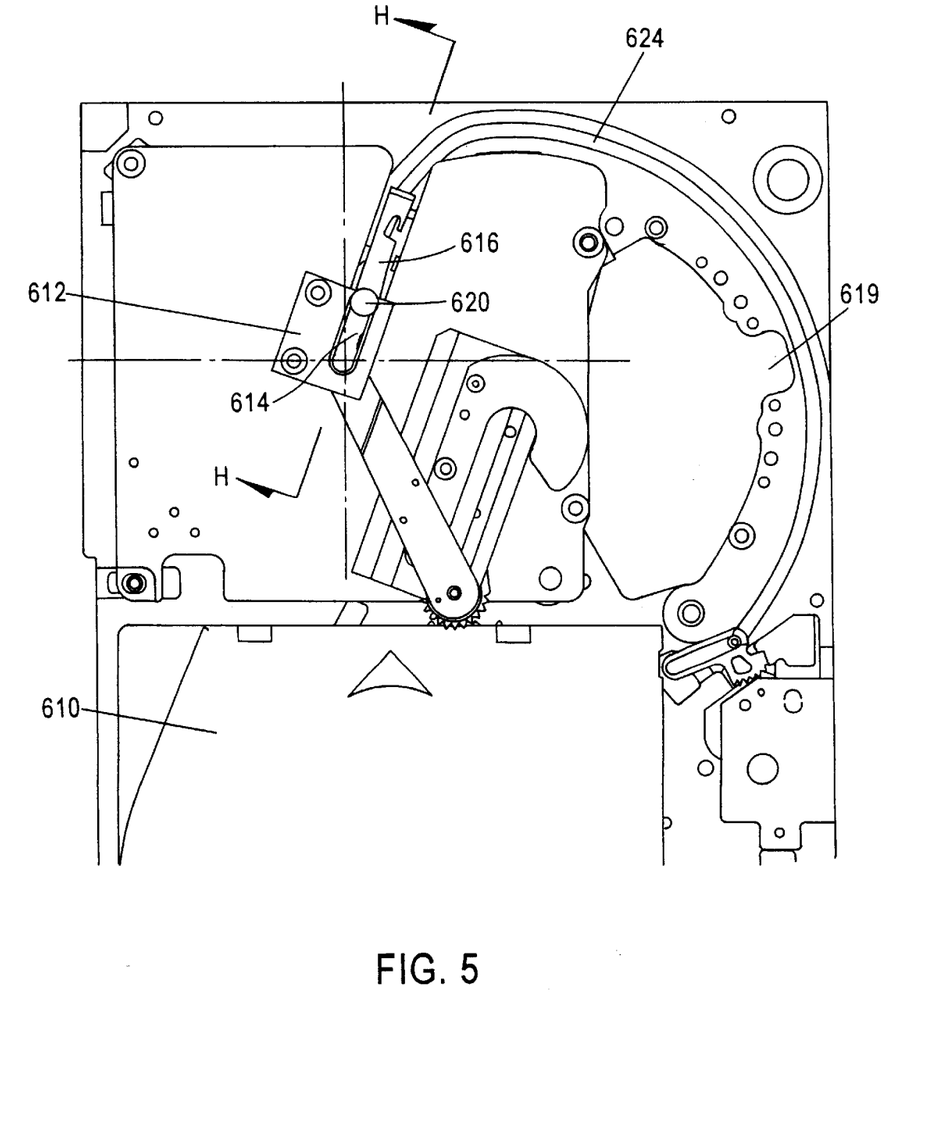
FIG. 5 is a top view of the tape drive loading mechanism of the present invention.

FIG. 5 is a top view of the tape drive loading mechanism. The single reel tape cartridge 610 is shown inserted in the tape drive. The hub filler 616 is shown entering the take-up reel 614, but not fully inserted. The axle 620 is shown at the entering position of the ramp 612. The hub filler 616 travels from the cartridge 610 to the take-up reel 614 along the guide rail 624, pulling tape from the cartridge 610 across a read/write head 619.

Figure 6:
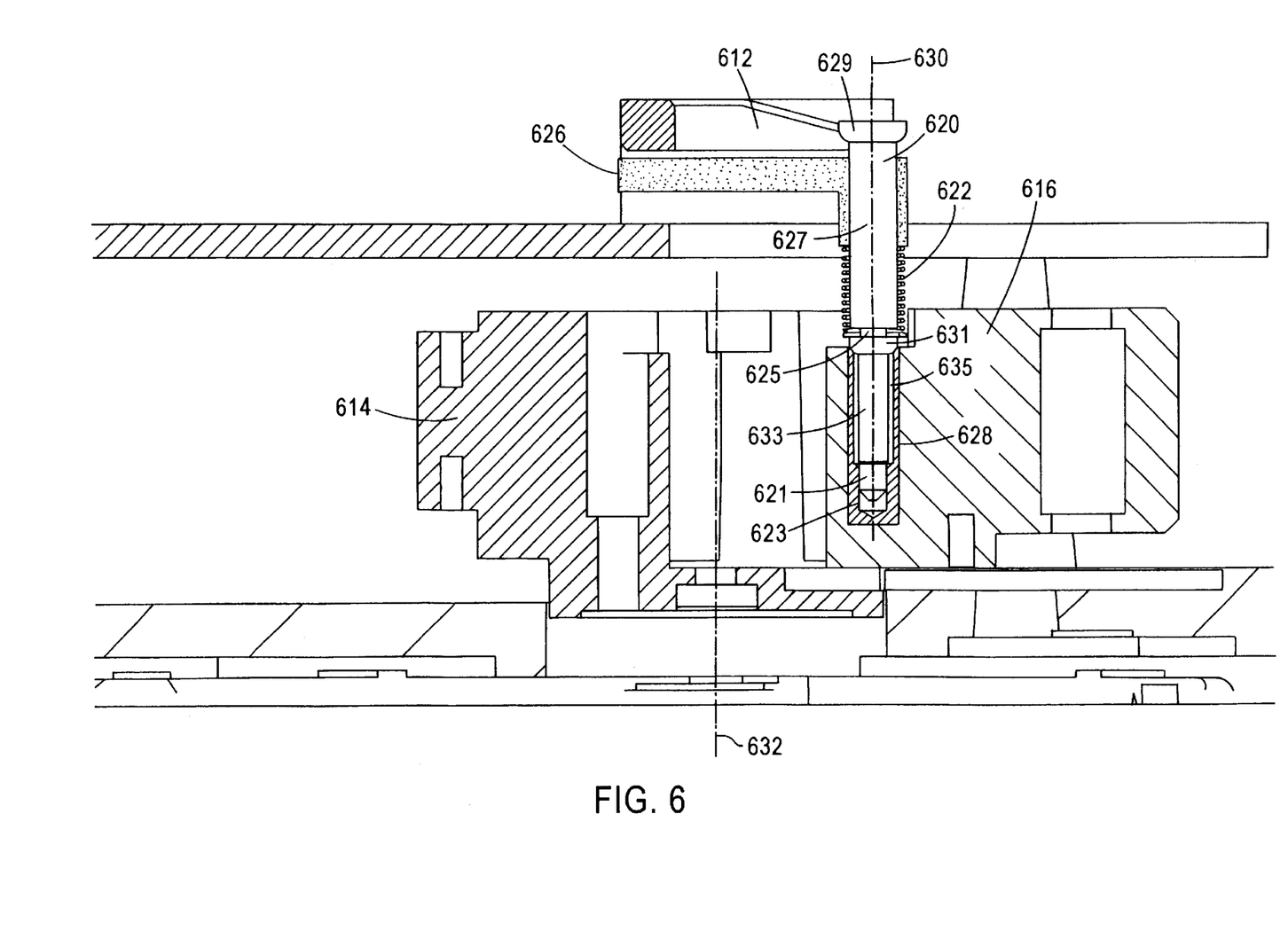
FIG. 6 is a side view of the hub filler entering the take-up reel.

FIG. 6 is a side view of the hub filler 616 entering the take-up reel 614. The side view of the hub filler 616 shows the axle 620 in a sheath 628 of the hub filler 616. Since the sheath 628 and the axle 620 are cylindrical, the hub filler 616 is able to pivot about the axle 620 as the hub filler 616 moves along the bends of the guide rail 624. A small shaft 621 of the axle 620 and a small bore 623 of the sheath 628 fit snugly together, such that the hub filler 616 pivots about the axle 620 and is tightly controlled by the movement of the guide arm 626. The spring 622 is attached to the axle 620 at a notch 625 in the axle 620. The other end of the spring 622 presses against the guide arm 626, creating tension and pushing the axle 620 into the sheath 628 of the hub filler 616. The axle axis 630 is the axis about which the hub filler 616 pivots during travel along the guide rail 624.

As will be explained in more detail with respect to FIGS. 7–9, the axle 620 is decoupled from the hub filler 616 by the ramp 612, so that the hub filler 616 can rotate freely on the axis of the take-up reel 614 during winding and unwinding of the tape. The large shaft 627 of the axle 620 is rotatable inside the bore of the guide arm 626. Above the large shaft 627 of the axle 620 is a top section 629 of the axle 620. As the hub filler 616 enters the take-up reel 614, the axle top section 629 contacts the ramp 612 and the axle 620 is lifted out of the hub filler 616. When the hub filler 616 is not in the take-up reel 614, the axle 620 is in the hub filler 616 and the hub filler 616 is tightly pivoting on the axle 620. A small spherical stop 631 interacts with the top of a large bore 635 to limit movement of the axle 620 into the sheath 628.

Figure 7:
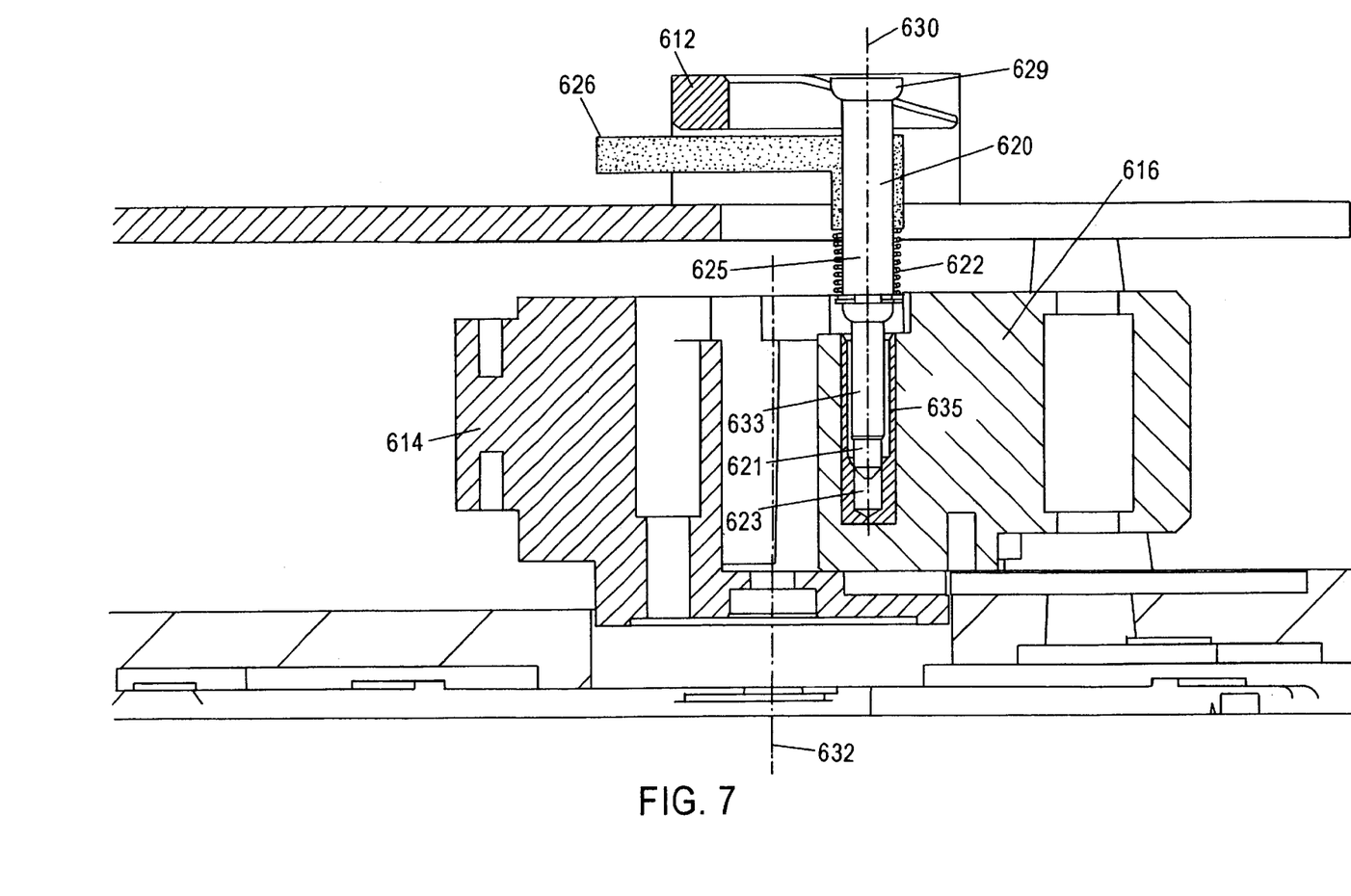
FIG. 7 is a side view of the hub filler entering the take-up reel and decoupling from the guide arm.

FIG. 7 is a side view of the hub filler 616 entering the take-up reel 614. The axle top section 629 and the axle 620 are lifted up the ramp 612 as the hub filler 616 moves into the take-up reel 614 driven by the guide arm 626. This causes the axle 620 to partially lift out of the hub filler 616. The small shaft 621 is almost, but not completely, removed from the small bore 623. The axis 630 of the axle 620 is now closer to the axis 632 of take-up reel 614 than shown in FIG. 6.

Figure 8:
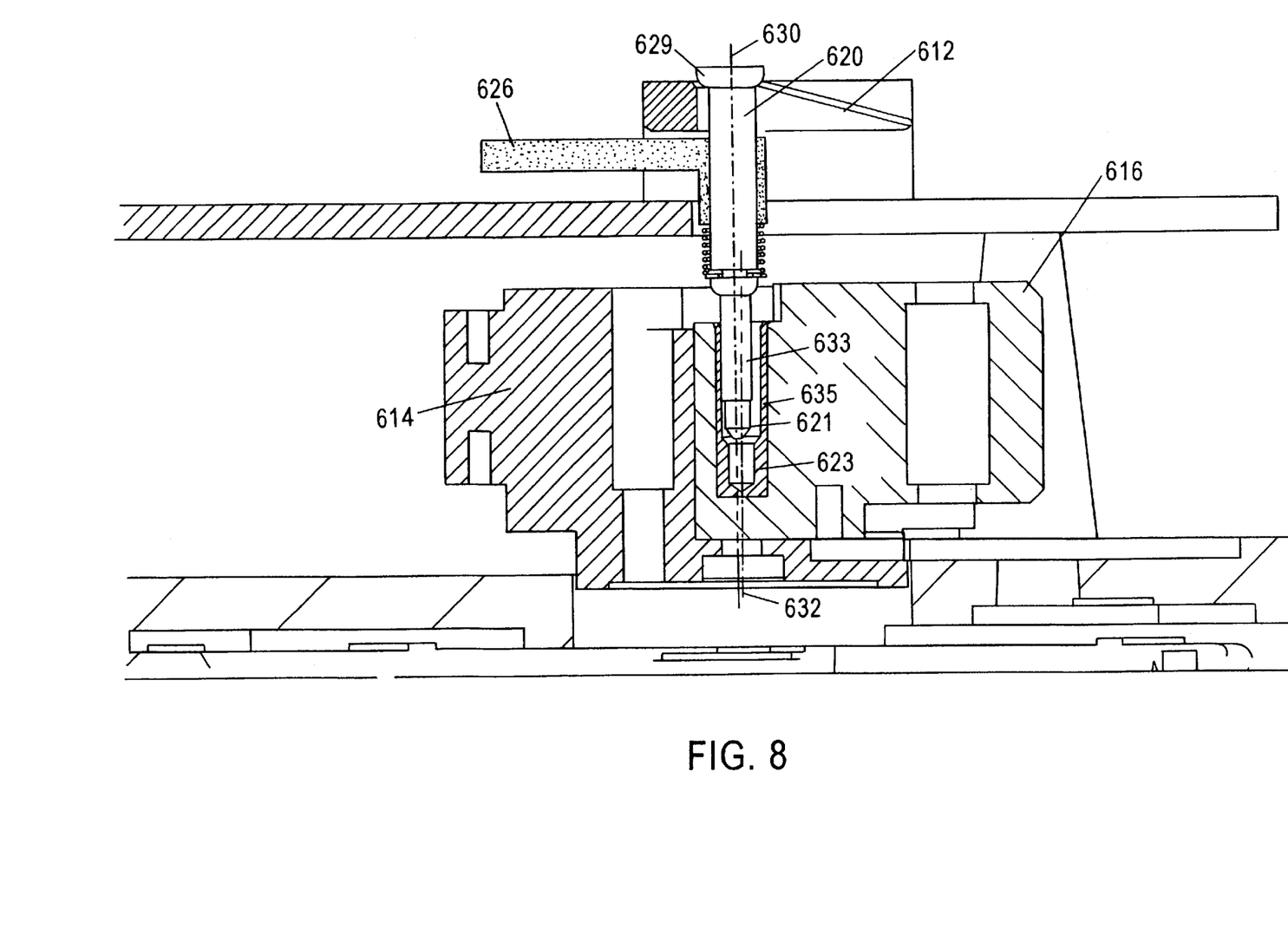
FIG. 8 is a side view of the hub filler completely lodged in the take-up reel.

FIG. 8 is a side view of the hub filler 616 in the take-up reel 614. The hub filler 616 is fully inserted in the take-up reel 614 due to the continued movement of the arrangement by the motor and linkage. In the illustrated embodiment, the axle 620 is lifted up by the ramp 612. A main shaft portion 633, of larger diameter than small shaft 621, pushes the hub filler 616 completely into the take-up reel 614 by pushing against one side of the large bore 635. The small shaft 621 has been completely lifted out of the small bore 623 to de-couple the small shaft 621 from the small bore 623. This allows some freedom of movement of the axle 620 in the hub filler 616. The main shaft portion 633 is only able to push the hub filler 616 through contact with the large bore 635 when the small shaft 621 is not de-coupled from the small bore 623. At this point, the guide arm 626 has pushed the hub filler 616 to the extreme end of the channel in the take-up reel 614. The axle 620 is still in contact with the hub filler 616 and is therefore not fully de-coupled from the hub filler 616. The axis 630 of the axle 620 is not aligned with the axis 632 of the take-up reel 614. In certain embodiments of the invention, the take-up reel 614 will rotate several times while the main shaft portion 633 is still in contact with the large bore 635.

Figure 9:
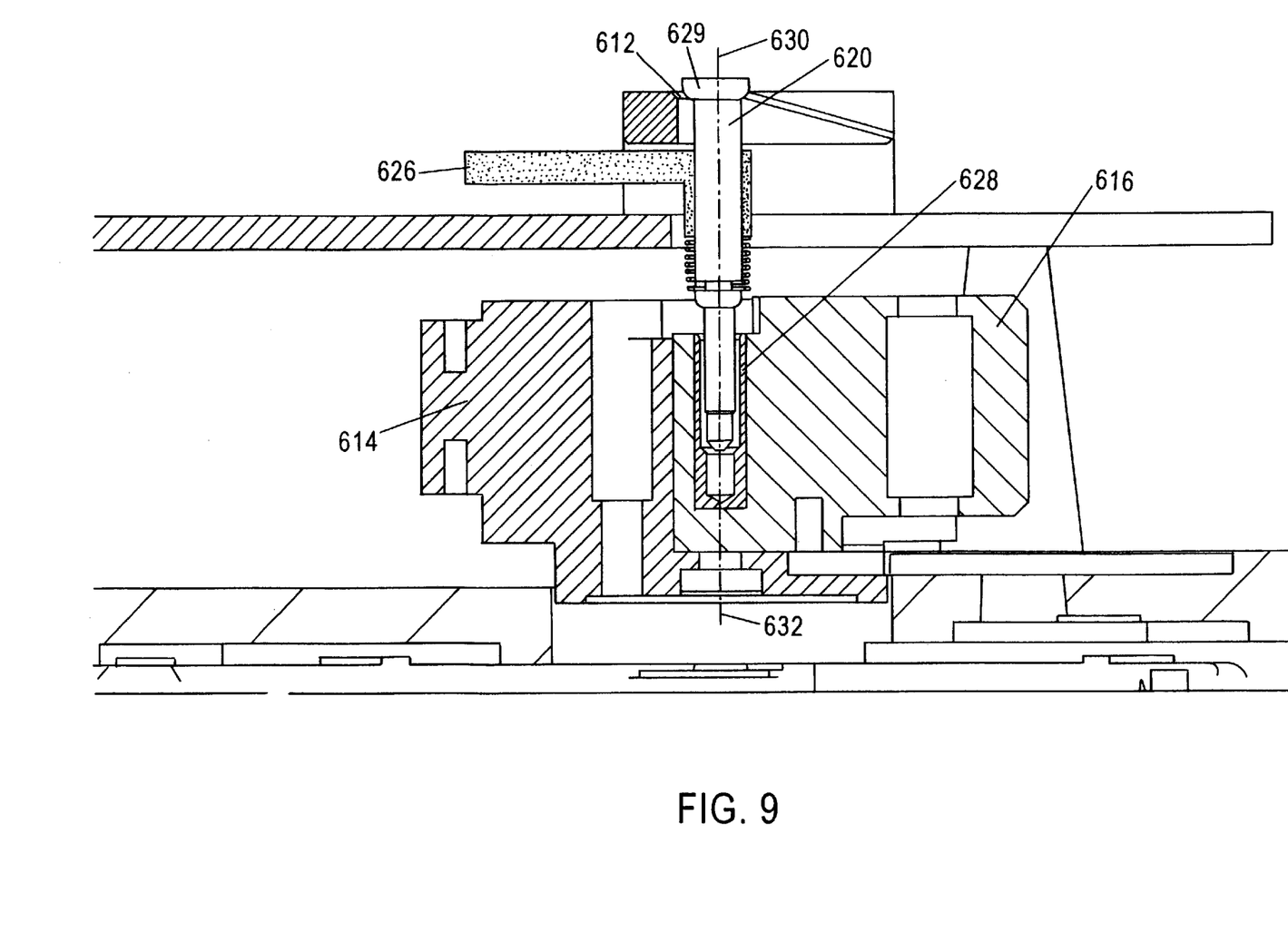
FIG. 9 is a side view of the hub filler in the take-up reel and decoupled from the guide arm.

FIG. 9 is a side view of the hub filler 616 in the take-up reel 614 when it is fully decoupled from the guide arm 626. The axle 620 is now centered in the sheath 628 such that the axis 630 of the axle 620 and the axis 632 of the take-up reel 614 are aligned. Since the guide arm 626 is fully de-coupled from the hub filler 616, the take-up reel 614 is able to rotate freely around the axis 632, immune from any small misalignments between the axle axis 630 and the take-up reel axis 632. This relative immunity helps prevent small speed variations and wearing down of the bearings.

In certain embodiments of the invention, the guide arm 626 is driven by a motor (not shown) with an encoder. The motor has encoded positions for positioning of the guide arm 626 throughout the loading and unloading of the tape; such positioning can include attachment of the tape 613 at the cartridge 610, movement along the guide rail 624 into the take-up reel 614, the de-coupling movements in the take-up reel 614, recoupling movements of the guide arm 626 with the hub filler 616, return of the tape to the cartridge, and detachment movements of the tape from the hub filler 616. Small misalignments due to the encoded motor position or other mechanical tolerations are immune in the take-up reel 614, as the axle 620 is de-coupled from the hub filler 616 during rotation of the take-up reel 614 during the reading and writing of the tape 613 in the tape drive.

Figure 10:
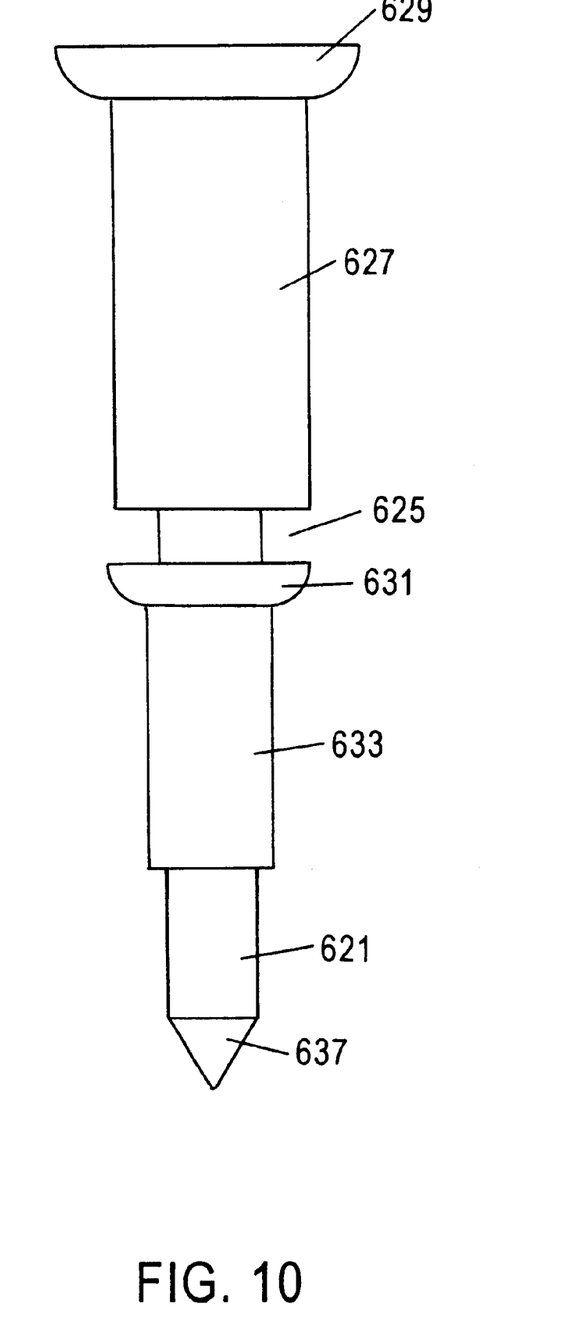
FIG. 10 is a side view of the axle.

FIG. 10 is a side view of the axle 620. The axle top section 629 is above the large shaft 627 which is above the notch 625 for the spring. The notch 625 for the spring is above the small spherical stop 631. The small spherical stop 631 is above the medium shaft 633. The medium shaft 633 is above the small shaft 621. The small shaft 621 is above the axle point 637.

Figure 11:
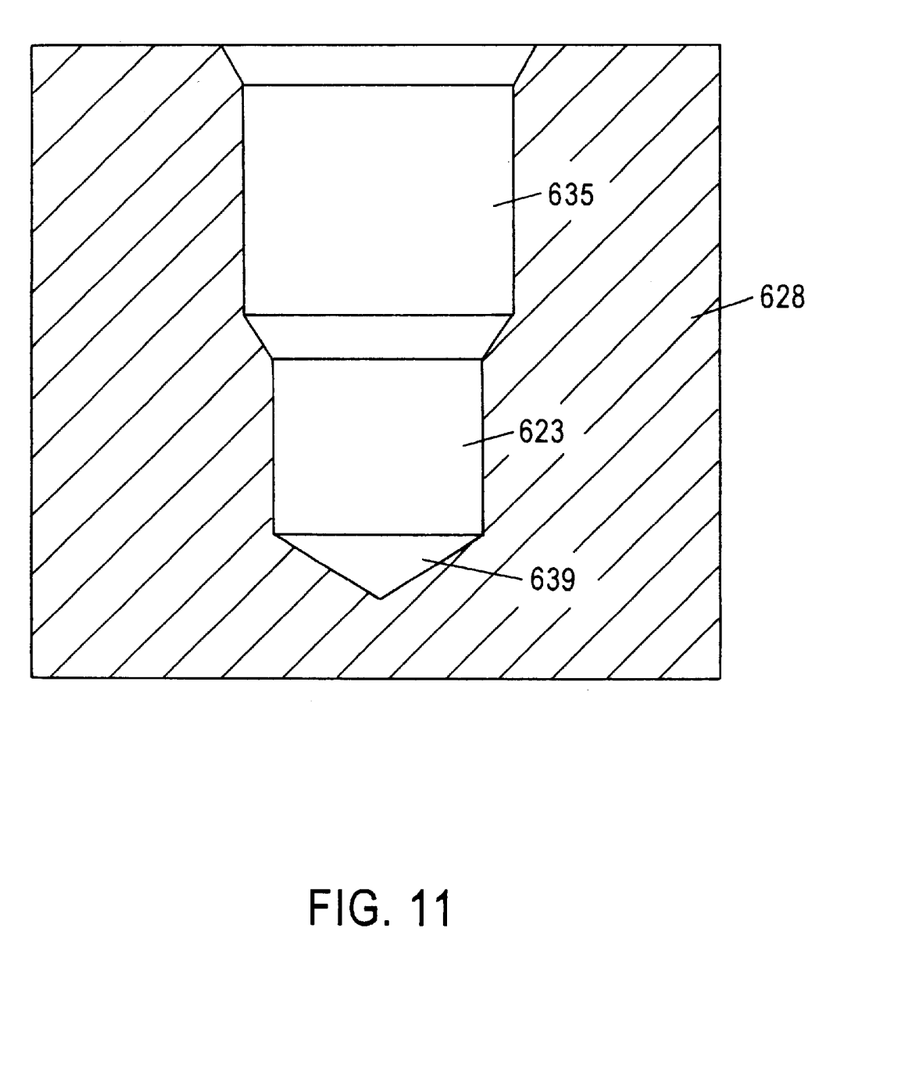
FIG. 11 is a side view of the shaft in the hub filler for receiving the axle.

FIG. 11 is a side view of the sheath 628 of the hub filler 616. The large bore 635 is above the small bore 623. The small bore 623 is above the axle's point receiver 639.

Figure 12:
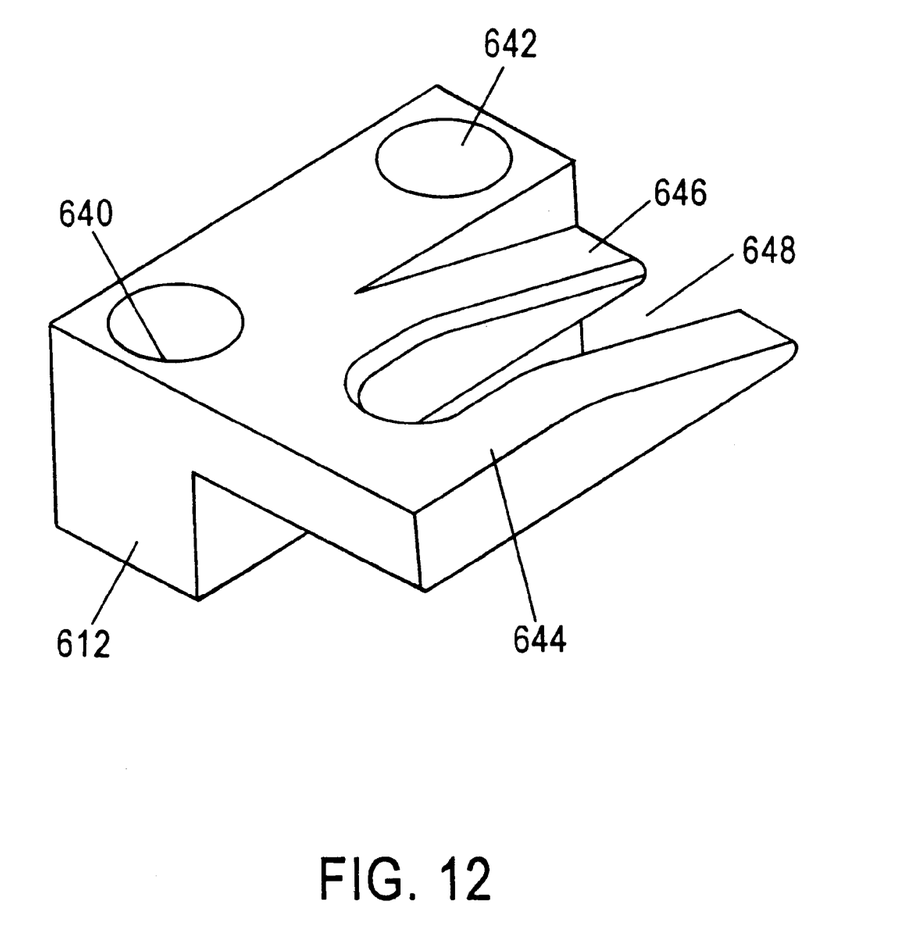
FIG. 12 is a view of the ramp.

FIG. 12 is a top perspective view of the ramp 612. The ramp 612 has a first bore 640 and a second bore 642 for attachment of the ramp 612 above the take-up reel 614. The ramp 612 has diagonal regions 646 and a plateau region 644. A channel 648 in the ramp 612 is disposed in the plateau region 644 and between the diagonal regions 646. As the axle 620 enters the channel 648 of the ramp 612, the top section 629 of the axle 620 is positioned between the diagonal regions 646 to catch on the ramp 612. The large shaft 635 travels inside the channel 648 as the axle 620 is lifted out of the hub filler by the ramp 612.

Figure 13:
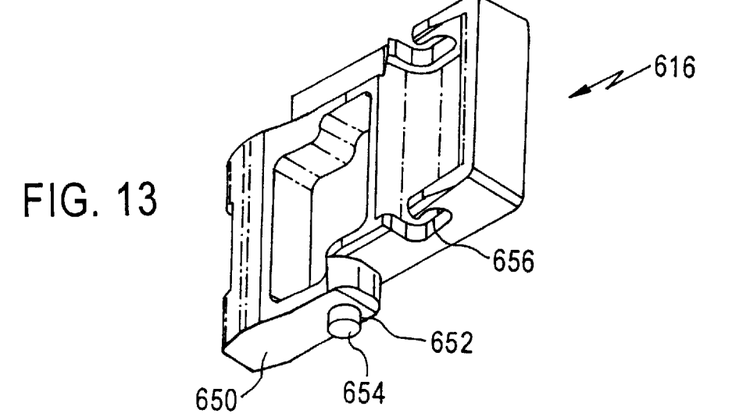
FIG. 13 is a bottom oblique view of the hub filler depicting a roller element.

FIG. 13 is an oblique view of hub filler 616 that comprises a roller 652. The notch 656 of hub filler 616 picks up and drops off tape 613 from a removable tape cartridge 610 that is to be loaded into a take-up reel. The tape 613 in the removable tape cartridge 610 normally comprises a pin attached to the end of the tape 613 to which the notch 656 attaches. The bottom surface 650 of the hub filler 616 rides on top of the guide rail and the roller 652 and roller pin 654 ride inside the guide rail 624 to guide the hub filler 615 smoothly between the removable tape cartridge 610 and the take-up reel 614. The roller pin 654 couples the roller 652 to the hub filler 616 and also serves as an axis about which the roller 652 rotates.

Figure 14:
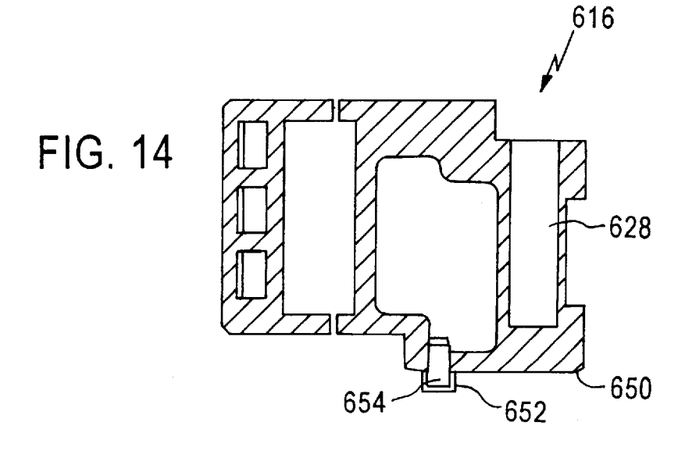
FIG. 14 is a cross-sectional view of the hub filler and roller element.

FIG. 14 is a cross-sectional view of the hub filler 616. Sheath 628 is shown and can be adapted to accommodate an axle 620, such as shown in FIG. 6, which may de-couple from the hub filler 616 when the hub filler 616 enters into the take-up reel 614. FIG. 14 also illustrates that the roller 652 surrounds and attaches to the roller pin 654. The roller pin 654 is fixedly attached to the hub filler 616.

Figure 15:
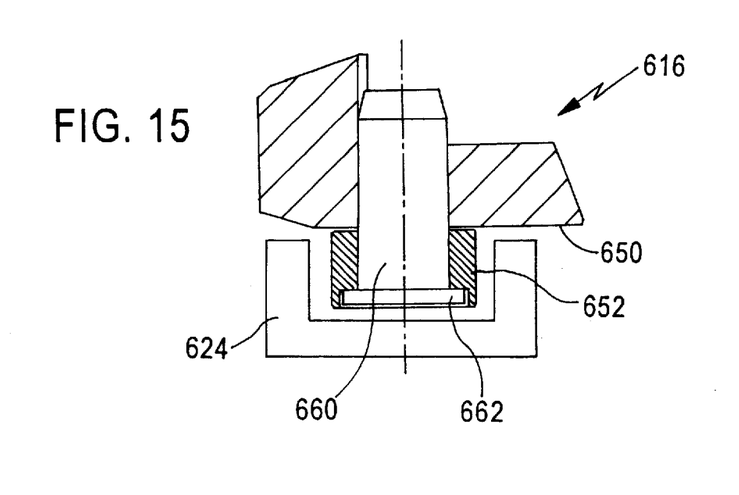
FIG. 15 is a cross-sectional view of the roller element.

FIG. 15 is an enlarged view of the roller 652 and the roller pin 654 inside guide rail 624. The roller pin comprises a main shaft 660 and a bottom section 662. The main shaft 660 serves as an axis about which the roller 652 can rotate. The bottom section 662 serves to attach the roller 662 to the hub filler 616, without preventing the roller 652 from rotating around the roller pin 654. One of ordinary skill in the art can appreciate other embodiments of a substantially frictionless guide. Examples are a ball bearing arrangement, a lubricating arrangement, a roller ball arrangement, and other low friction guiding mechanisms.

The present invention provides an improved implementation of a hub filler for substantial frictionless guiding the hub filler between a tape cartridge and a take-up reel. In certain embodiments, the roller is attached to the bottom of the hub filler by a roller pin. As the hub filler travels between the tape cartridge and the take-up reel, the hub filler is guided by a guide rail. The hub filler rides on top of the guide rail and the roller is in contact with the inside of the guide rail. The present invention also provides an improve method of loading a tape from a single reel cartridge into a take-up reel. This is accomplished, in part, by a guide arm being de-coupled from a hub filler as it enters a take-up reel. The de-coupling mitigates problems of conventional tape drive mechanisms that result from small misalignments of the axis of the hub filler axle with the axis of the take-up reel. The axle and drive arm are fully de-coupled from the hub filler by the axle by being lifted out of the hub filler, allowing for the take-up reel to rotate freely during winding and unwinding of the tape without interference from the axle.

Although the present invention has been described and illustrated in detail, it is to be clearly understood that the same is by way of illustration and example only, and is not to be taken by way of limitation. The scope of the present invention being limited only by the terms of the appended claims.

What is claimed is:

1. A tape loading device for loading tape from a tape cartridge to a take-up reel, wherein:

a hub filler driven independently of the take-up reel;

means for guiding the hub filler between the tape cartridge and the take-up reel:

means for guiding the hub filler between the tape cartridge and take-up reel comprises:

a guide rail from the tape cartridge to an interior of the take-up reel, the hub filler biased against and contacting the guide rail;

a roller rotatable attached on the hub filler and coupled to the guide rail;

the hub filler comprises a pin;

the roller is rotatable mounted on the pin to thereby rotatable attach the roller to the hub filler; wherein the roller comprises an opening in the center of the roller; and the pin is disposed through the opening, allowing the roller to rotate around the pin.

2. The tape loading device of claim 1, wherein the movement of the roller in relation to the pin is substantially limited only to rotation of the roller around the pin.

3. The tape loading device of claim 2, wherein the roller rolls along the guide rail during loading and unloading of tape from the tape cartridge to the take-up reel.

4. The tape loading device of claim 1, wherein the means for guiding the hub filler between the tape cartridge and the take-up reel further comprises:

an opening in the take-up reel capable of receiving the hub filler, wherein a guide arm is coupled to the hub filler when the hub filler is between the tape cartridge and an edge of the take-up reel and decoupled from the hub filler when the hub filler, is in the take-up reel.

5. A method of loading and unloading a take-up reel with tape comprising the steps of:

attaching an end of a tape in a tape cartridge to a hub filler;

guiding the hub filler along a guide rail into a take-up reel, wherein the hub filler is carried by a guide arm, and the hub filler comprises a roller which couples the hub filler to the guide rail;

biasing the hub filler against the guide rail to contact the guide rail;

guiding the hub filler along the guide rail to the tape cartridge; and detaching the end of the tape from the hub filler;

the hub filler comprises a pin protruding into the guide rail;

the roller is coupled to the hub filler by the pin; wherein:

the roller comprises an opening in the center of the roller; and the pin is disposed through the opening, allowing the roller to rotate around the pin.

6. The method of claim 5, wherein the roller rolls along the guide rail during loading and unloading of tape from the removable tape cartridge to the take-up reel.

7. The method of claim 6, wherein:

the pin comprises a first section and a second section;

both the first section and the second section are cylindrically shaped;

the first section is between the hub filler and the second section; and the second section has a larger circumference than the first section.

8. The method of claim 7, wherein the second section and the hub filler substantially limits the roller to only rotating around the first section.

9. The method of claim 5, wherein the take-up reel comprises an opening capable of receiving the hub filler, wherein the guide arm is coupled to the hub filler when the hub filler is between the tape cartridge and an edge of the take-up reel and decoupled from the hub filler when the hub filler is in the take-up reel.

* * * * *